Oct. 21, 1969    J. H. DUFF    3,473,661
METHOD AND APPARATUS FOR REMOVING SUSPENDED SOLIDS FROM LIQUIDS
Filed Dec. 27, 1967    2 Sheets-Sheet 1
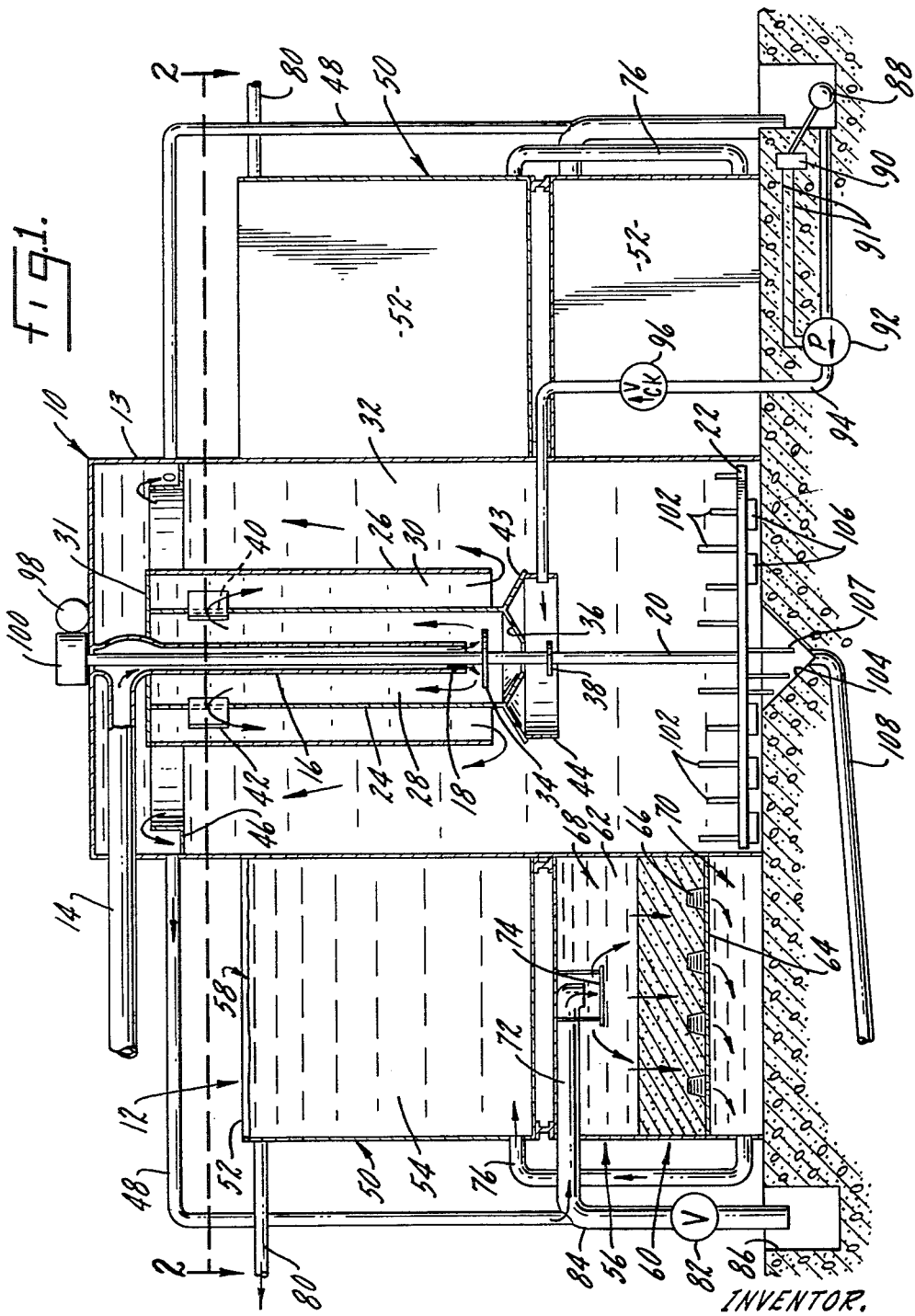
INVENTOR.
Joseph H. Duff,
BY Hume, Clement, Hume & Lee
Attorneys.

Oct. 21, 1969

J. H. DUFF 3,473,661

METHOD AND APPARATUS FOR REMOVING SUSPENDED SOLIDS FROM LIQUIDS

Filed Dec. 27, 1967

INVENTOR.
Joseph H. Duff,
BY Hume, Clement, Hume & Lee
Attorneys.

United States Patent Office 3,473,661
Patented Oct. 21, 1969

3,473,661
METHOD AND APPARATUS FOR REMOVING
SUSPENDED SOLIDS FROM LIQUIDS
Joseph H. Duff, Basking Ridge, N.J., assignor, by mesne
assignments, to Union Tank Car Company, Chicago,
Ill., a corporation of Delaware
Filed Dec. 27, 1967, Ser. No. 698,680
Int. Cl. B01d 35/22, 35/00, 21/00
U.S. Cl. 210—82                           11 Claims

ABSTRACT OF THE DISCLOSURE

Suspended solids are removed from liquids by sedimentation and filtration. In the sedimentation step, liquid is introduced into an upper portion of a sedimentation vessel and directed in successive upward and downward directions while permitting sedimentation of solids into a lower portion, maintained in a quiescent state. The liquid is then passed through filters to remove remaining particles. Periodically, the filters are washed, preferably by back-washing, and the wash water introduced into the lower, quiescent portion of the sedimentation vessel where it is thickened and eventually disposed of.

The invention also includes apparatus for carrying out the method including sedimentation means and filtration means. The sedimentation means includes a vessel having an upper zone, where the flow of liquid is reversed in a vertical direction and a lower, quiescent zone for collecting particles. The filters are conventional, preferably of the self-backwashing type.

---

The present invention relates to improvements in the art of separating suspended solids from liquids, and more specifically to an improved method and apparatus for removing suspended solids from liquids by sedimentation and filtration.

While solids removal systems combining sedimentation and filtration have long been known, such systems have suffered from a number of inherent disadvantages. Primary among these is the large amount of space and slow flow rates required for effective sedimentation. Further, such apparatus have been extremely bulky because large sedimentation vessels were required. Another difficulty and expense often presented by available devices is the need for separate tanks to accomplish sludge thickening.

Generally, the present invention provides an improved method and apparatus for separating suspended solids from liquids through the use of sedimentation in combination with filtration. In carrying out the method, liquid containing suspended solids is continuously introduced into an upper portion of the sedimentation vessel, and the flow of the liquid is directed in successive upward and downward directions within the upper portion of the vessel, while permitting the sedimentation of solids into a lower portion. Because the liquid flow is in the upper portion, the lower portion of the vessel is maintained in a relatively quiescent state. Liquid is withdrawn from the vessel at a point near the top and filtered, removing the majority of the remaining solids. Periodically, the filter means are washed to remove collected solids, and the wash water containing the solids introduced into the lower, quiescent portion of the sedimentation vessel. This washing and introduction of the wash water containing suspended solids is carried out simultaneously with the introduction of liquid containing suspended solids into the upper portion of the sedimentation vessel. Periodically, solids collected at the bottom of the sedimentation vessel are removed.

The present invention also provides apparatus for carrying out the aforementioned method, generally comprising a sedimentation vessel having an upper sedimentation zone and a lower solids collection zone. The vessel has inlet means for introducing liquid into the sedimentation zone and flow control means for controlling and reversing the direction of flow of the liquid in a vertical direction in the sedimentation zone. The flow control means are designed to permit the settling of solids into the lower solids collection zone. Means are provided for withdrawing liquid from the sedimentation zone and a plurality of filter means are provided for filtering it. Finally, filter washing means are provided for washing solids from the filter means, together with filter wash delivery means for delivering wash liquid containing solids removed from the filter into an upper portion of the solids collection zone within the sedimentation vessel. The filter washing means and filter wash delivery means are constructed and arranged so that one of the filter means can be washed while the remaining filter means continue to remove solids from the liquid.

The invention, both as to its construction and method of operation, taken together with the objects and advantages thereof, will best be appreciated by reference to the following detailed description, taken in conjunction with the drawings, in which:

FIGURE 1 is a cross-sectional view of an apparatus embodying the features of the present invention; and FIGURE 2 is a cross-sectional view of the apparatus taken along line 2—2 of FIGURE 1.

In carrying out the method of the present invention, water containing solids is introduced into an upper portion of a sedimentation vessel wherein it is directed in successive upward and downward directions while permitting the sedimentation of solids into the lower portion of the vessel. Because of the relatively constant agitation maintained in the upper portion, primarily only the heavier solids will settle into the lower portion of the vessel. The liquid containing the lighter solids is withdrawn from the vessel, preferably at a point near the top, and filtered. The filtration removes the lighter suspended solids, so that the liquid will be rendered substantially free of suspended solids. Periodically, the filter means are washed to remove collected particles. The wash liquid, containing the particles washed from the filter means, is introduced into the lower portion of the sedimentation vessel, where the particles settle to the bottom. In the preferred embodiment, the liquid used for washing will have passed through the filter means, and will be retained in a storage chamber so that the filter means may be backwashed by simply allowing the liquid in the storage chamber to flow, under the force of gravity, through the filter means in a reverse direction.

It is also preferred that the solids washed from the filter means be collected in a sump prior to introduction into the lower portion of the sedimentation vessel. This permits the rapid cleaning of the filters, minimizing interruption of the process, while allowing the relatively slow feeding of the wash liquid and suspended particles into the lower portion of the sedimentation vessel. This relatively slow feeding minimizes agitation in the lower portion, and provides maximum opportunity for effective sedimentation.

Referring now to FIGURE 1 and FIGURE 2, the preferred embodiment of the present invention includes apparatus having a sedimentation means, generally indicated by reference numeral 10, and filter means, generally indicated by reference numeral 12. Liquid containing suspended solids is supplied to a generally cylindrical, vertical sedimentation vessel 13 through a liquid supply line 14 communicating with a central, vertical inlet pipe 16.

As shown in FIGURE 1, the inlet pipe 16 terminates at a point well above the bottom of the vessel 13, and has an opening 18 at the bottom end thereof. A rotatable shaft 20 projects through the center of the inlet pipe 16, and carries a horizontal scraper bar 22 on the lower end thereof, adjacent to the bottom of the sedimentation vessel 13. Surrounding the inlet pipe 16 is an inner, vertical cylindrical wall 24, which is coaxial with the inlet pipe 16. Surrounding the inner cylindrical wall 24 is an outer cylindrical wall 26, also coaxial with the inlet pipe 16. Finally, the outer cylindrical wall 26 is surrounded by the wall of the cylindrical sedimentation vessel 13, which is also coaxial with the inner and outer cylindrical walls 24, 26, respectively. The space between the inlet pipe 16 and the inner cylindrical wall 24 forms an inner liquid upflow zone 28, while a downflow zone 30 is formed by the space between the inner cylindrical wall 24 and the outer cylindrical wall 26. As shown in FIGURE 1, these zones 28, 30 are closed at the top by a horizontal wall 31. An outer upflow zone 32 is formed by the space between the outer cylindrical wall 26 and the side wall of the sedimentation vessel 13.

The direction of flow of liquid entering through the inlet pipe 16 is reversed from vertically downward to vertically upward by a horizontal, flat circular baffle 34 mounted on the shaft 20 just below the opening 18 in the inlet pipe 16. The introduction of turbulence into the lower portion of the sedimentation vessel 13 is prevented by a downwardly converging frustoconical baffle 36 attached to the bottom of the inner cylindrical wall 24, and by a lower horizontal, flat circular baffle 38 attached to the rotatable shaft 20, and positioned below the downwardly converging baffle 36. Near the top of the inner cylindrical wall 24 are openings 40 which provide communication between the inner upflow zone 28 and the downflow zone 30. As shown in FIGURE 2, the openings 40 preferably include angled baffles 42 for creating turbulence in the liquid as it passes from the upflow zone 28 to the downflow zone 30, thus maintaining the lighter solids in suspension. As shown in FIGURE 1, the flow direction of the liquid is again reversed from a downward to an upward direction as it emerges from the downflow zone 30, and enters the outer upflow zone 32. As shown by the arrows, this reversal of flow direction is accomplished by an upwardly converging, frusto-conical baffle 43 carrying a lower vertical cylindrical wall 44. The incline of the upwardly converging baffle 43 permits the sedimentation of solids to the bottom of the vessel 13. Because the various baffles 34, 36, 38, 42, 43, 44, maintain flow within an upper, sedimentation zone of the sedimentation vessel 13, the zone below the level of the baffles will remain in a relatively quiescent state.

Liquid flowing upwardly in the outer upflow zone 32 is collected in an annular flume 46, running around the periphery of an upper interior wall of the vessel 13. Liquid flows from the flume 46 to filter inlet pipes 48, which carry it to the filter means 12.

As shown in FIGURE 2, the preferred embodiment of the present invention employs annular filter means 12 surrounding the sedimentation means 10 and comprising a plurality of adjacent filters 50 separated by vertical partitions 52. The filters 50 are basically of the self-backwashing type, similar to those described in U.S. Patents Nos. 3,260,366, and 3,342,334, which are assigned to the assignee of the present invention. It will be understood that the particular shape and arrangement of the filters 50 is not critical. That is, while the annular arrangement shown in the drawings provides a maximum of space utilization, filters of cylindrical or other shape could be employed if space were not a primary consideration.

The detail and operation for one filter 50 is described below, it being understood that this description applies equally to each of the filters 50.

Referring again to FIGURE 1, each filter 50 comprises an upper, open tank 54 mounted by suitable means upon a lower, closed tank 56. The upper tank 54 forms a backwash storage chamber 58, while the lower tank 56 forms a filter chamber 60. The filter chamber 60 contains a bed of suitable filter media 62, such as sand or the like, which is situated on a false bottom member 64 with strainer means 66, as is well known in the art. In this manner, an inlet compartment 68 and an underdrain compartment 70 are formed, respectively above and below the filter media 62 in the filter chamber 60.

During the service cycle, liquid from the sedimentation means 10 travels through the filter inlet pipe 48 into a transfer conduit 72. As will be more apparent hereinafter, the transfer conduit 72 is also utilized to remove backwash liquid from the inlet compartment 68. Liquid from the transfer conduit 72 flows out and strikes a horizontal baffle 74, which serves to evenly distribute it over the filter media 62. As shown by the arrows in FIGURE 1, the liquid flows through the filter media 62 and enters the underdrain compartment 70 through the strainer means 66. The materials suspended in the liquid are extracted and retained by the filter media 62.

The filtered liquid flows from the underdrain compartment 70 through a connecting duct 76 and into the backwash storage chamber 58 at a point near the bottom. A service outlet pipe 80 communicates with the backwash storage chamber 58 at a point near the top. Filtered liquid from the connecting duct 76 fills the backwash storage chamber 58 until it reaches the level of the service outlet pipe 80, at which time the treated liquid passes through the service outlet pipe 80 for utilization.

Periodically, each filter 50 undergoes a backwashing cycle to remove collected particles from the filter media 62. To initiate this cycle, a valve 82 in a backwash pipe 84 communicating with the transfer conduit 72 is opened, providing communication between the inlet compartment 68 and an annular sump through 86. Filtered liquid retained in the backwash storage compartment 58 will flow through the connecting duct 76 into the underdrain compartment 70 of the filter chamber 60. The backwash liquid flows upwardly through the filter media 62, enters the inlet compartment 68, and passes through the transfer conduit 72 to the backwash pipe 84. This upflow of liquid through the filter media 62 backwashes solid matter that has been collected during the filtration of liquid delivered from the sedimentation means 10.

During the backwashing cycle, liquid continues to flow from the sedimentation means 10 to the filter inlet pipe 48. This liquid flows directly to the backwash pipe 84, where it mixes with the backwash liquid and enters the annular sump trough 86. This liquid will be collected and redelivered to the sedimentation means 10, as will hereinafter appear.

A float 88 senses the rise of the water level in the sump trough 86 as a filter is backwashed. At a preselected level, the rising float 88 engages a switch 90, completing a circuit through wires 91 and activating a pump 92. The pump 92 pumps the liquid from the annular sump trough 86 into an upper portion of the lower quiescent zone of the sedimentation vessel 13 through a pipe 94. The pipe 94 communicates with the sedimentation means 10 just inside the lower, cylindrical wall 44, where very little turbulence will be encountered. The pipe 94 preferably includes a check-valve 96 to prevent reverse flow.

This pumping procedure continues after each filter cleaning step is completed, and thus takes place fairly slowly creating a minimum of turbulence in the lower area of the sedimentation vessel 13. This may be done even though the backwash step is performed rapidly, minimizing interruption of operation for a particular filter 50.

The number of filters 50 required depends upon several factors including the speed with which liquid is passed through the apparatus, the amount of solid material in the liquid, and the capacity of each individual filter. Generally, about four to twelve filters will be employed. These are separately backwashed so that operation of the overall apparatus is not interrupted.

The filter backwash procedure may be modified to include draindown and air cleaning steps prior to backwashing. In some cases, the washing efficiency may be improved thereby. Basically, these steps require that the underdrain compartment 70 and the inlet compartment 68 be drained while retaining liquid in the backwash storage chamber 58. Pressurized air is then forced upwardly through the filter media 62 to dislodge entrapped particles. Backwashing is then carried out as hereinbefore described.

As previously mentioned, the heavier particles contained in the liquid will settle out as it passes through the upper sedimentation zone of the sedimentation vessel 13. These solid particles settle into a lower quiescent zone, the top of which is defined generally by the frustoconical baffles 36, 43. Solid materials of a lighter variety are also introduced into the lower quiescent zone through the pipe 94 carrying the filter backwash liquid. These particles, often referred to as "sludge," are collected and gently agitated by the horizontal scraper bar 22, which is rotated at a relatively slow tip speed of about 6 to 20 feet per minute. Power for the scraper bar 22 is provided by a motor 98 driving the shaft 20 through a reduction gear box 100. The bar 22 preferably contains a plurality of upright thickening pickets 102 mounted on the top thereof, which aid in the collection and thickening of particulate material, while the rotation prevents thixotropic gelation, which would make the sludge difficult to remove.

The bottom of the sedimentation vessel 13 preferably has a generally conical indentation 104 for collecting the sludge that has settled to the bottom. Feeding of this sludge to the conical indentation 104 is facilitated by a plurality of angled blades 106 mounted on the underside of the bar 22. Thixotropic gelation of the sludge in the cone is prevented by downwardly projecting pickets 107. Periodically, the sludge may be pumped from the bottom of the vessel 13 through a sludge disposal pipe 108 and disposed of.

As may be seen from the foregoing description, the method and apparatus of the present invention permit the rapid purification of liquids by sedimentation and filtration in a minimum of space. Furthermore, wastage of liquid is minimized by recovering solids from the liquid used in washing the filtered means. This is made possible by the maintenance of a lower quiescent zone in the sedimentation means 10, which is separated by suitable baffles from an upper sedimentation zone. In the preferred embodiment, the use of a rotating bar with thickening pickets also maximizes the concentration and prevents thixotropic gelation of sludge, and thus further improves the efficiency of operation.

I claim:

1. A method for separating suspended solids from liquids with a sedimentation vessel and a plurality of filter means comprising: continuously introducing liquid containing suspended solids into an upper portion of said sedimentation vessel; directing the flow of said liquid in successive upward and downward directions within said upper portion while permitting the sedimentation of solids into a lower relatively quiescent portion of said vessel; withdrawing said liquid from said vessel at a point near the top; passing said liquid through said filter means; periodically washing each of said filter means to remove solids collected thereby; introducing the washing liquid containing said solids into a lower portion of said sedimentation vessel simultaneously with the introduction of liquid containing suspended solids into said upper portion of said sedimentation vessel; and periodically removing solids collected at the bottom of said sedimentation vessel.

2. The method of claim 1 wherein said filter means are washed with liquid that has passed through said filter means and is retained in a backwash storage chamber for reverse flow through said filter means.

3. Improved apparatus for separating suspended solids from liquid comprising: a sedimentation vessel having an upper sedimentation zone and a lower relatively quiescent solids collection zone; inlet means for introducing liquid into said sedimentation zone; flow control means for controlling and reversing the direction of flow of said liquid in a vertical direction in said sedimentation zone while permitting the sedimentation of solids into said solids collection zone; means for withdrawing liquid from said sedimentation zone; a plurality of filter means for removing further solids from said liquid after it has been removed from said sedimentation zone; filter washing means for separately washing solids from each of said filter means; filter wash delivery means for delivering filter wash water containing solids removed from said filter means into an upper portion of said solids collection zone; said filter washing means and said filter wash delivery means being constructed and arranged so that one of said filter means can be washed while the remaining filter means continue to remove solids from said liquid; and means for removing solids from said solids collection zone.

4. The apparatus as defined in claim 3 wherein said filter wash delivery means includes sump means for collecting said filter wash water and pump means together with pipe means communicating with said solids collection zone for delivering said filter wash water to an upper portion of said solids collection zone.

5. The apparatus as defined in claim 4 wherein said sump means comprises a peripheral trough surrounding said sedimentation vessel and said filter means.

6. The apparatus as defined in claim 5 further including pump control means operatively connected to start said pump upon the collection of a predetermined level of liquid in said trough.

7. Improved apparatus for separating suspended solids from liquid comprising: a sedimentation vessel having an upper sedimentation zone and a lower solids collection zone; inlet means for introducing liquid into said sedimentation zone; flow control means for controlling and reversing the direction of flow of said liquid in a vertical direction in said sedimentation zone while permitting the sedimentation of solids into said solids collection zone, said flow control means including a plurality of vertical, coaxial, cylindrical walls defining adjacent annular flow zones and baffle means for reversing the direction of flow of said liquid as it passes between adjacent flow zones; means for withdrawing liquid from said sedimentation zone; filter means for removing further solids from said liquid after it has been removed from said sedimentation zone; filter washing means for washing solids from said filter means; filter wash delivery means for delivering filter wash water containing solids removed from said filter means into an upper portion of said solids collection zone; and means for removing solids from said solids collection zone.

8. The apparatus as defined in claim 7 wherein said inlet means comprises a central vertical pipe having an outlet opening at the bottom end thereof, said pipe positioned along the axis of the innermost of said vertical, coaxial, cylindrical walls.

9. The apparatus as defined in claim 8 further including a horizontal solids collecting bar mounted for rotation in a horizontal plane at the bottom of said vessel, said bar including a plurality of vertical pickets for collecting and retaining said solids; and drive means operatively connected to said bar to rotate it in a horizontal plane.

10. Improved apparatus for separating suspended solids from liquids comprising: a sedimentation vessel having an upper sedimentation zone and a lower solids collection zone; a central vertical inlet pipe extending to a lower portion of said solids collection zone and having an outlet opening at the bottom end thereof; an inner, vertical, cylindrical wall and an outer, vertical, cylindrical wall, said walls coaxial with said inlet pipe and approximately coextensive therewith, said inner wall having openings in an upper portion thereof providing communication with the space between said inner wall and said outer wall; baffle means for reversing the direction of flow between said inlet pipe and said inner wall and between said outer wall and the wall of said sedimentation vessel; a flume along the upper periphery of the interior of said sedimentation vessel for collecting liquid that has passed through said vessel; means for withdrawing liquid from said flume; filter means for removing further solids from said liquid removed from said flume, said filter including a storage compartment for liquid that has passed therethrough; means for backwashing said filter with said liquid contained in said storage compartment; a peripheral sump trough surrounding said sedimentation vessel and said filter means; delivery means for delivering filter wash liquid containing solids removed from said filter means into said trough; pump means together with pipe means communicating with an upper portion of said solids collection zone for delivering said wash liquid to said solids collection zone; control means operatively connected to start said pump upon the collection of a predetermined level of liquid in said trough.

11. The apparatus as defined in claim 10 further including a horizontal solids collecting bar mounted for rotation in a horizontal plane at the bottom of said vessel, said bar including a plurality of vertical pickets for collecting and retaining said solids; and drive means operatively connected to said bar to rotate it in a horizontal plane.

References Cited

UNITED STATES PATENTS

| | | | |
|---|---|---|---|
| 553,763 | 1/1896 | Roeske | 210—265 |
| 827,400 | 7/1906 | Sheuerman et al. | 210—265 X |
| 1,149,750 | 8/1915 | Greth et al. | 210—265 X |
| 1,166,802 | 1/1916 | Albert et al. | 210—265 |
| 1,398,285 | 11/1921 | Tanner | 210—265 |
| 1,624,382 | 4/1927 | Bartlett | 210—82 X |
| 2,948,400 | 8/1960 | Hagen | 210—265 X |
| 3,306,447 | 2/1967 | Medeiros | 210—220 X |

JAMES L. DECESARE, Primary Examiner

U.S. Cl. X.R.

210—108, 203, 265, 298, 528